(12) United States Patent
Fernandez Pueyo et al.

(10) Patent No.: US 11,646,566 B2
(45) Date of Patent: May 9, 2023

(54) APPARATUS FOR PERMANENT SUPPLY WITH A SWITCH

(71) Applicant: Lear Corporation, Southfield, MI (US)

(72) Inventors: Carlos Fernandez Pueyo, Valls (ES); Ignacio Molinero Horno, Valls (ES); Antoni Ferré Fàbregas, Valls (ES); Sergio Alquézar, Valls (ES)

(73) Assignee: Lear Corporation, Southfield, MI (US)

( * ) Notice: Subject to any disclaimer, the term of this patent is extended or adjusted under 35 U.S.C. 154(b) by 23 days.

(21) Appl. No.: 17/123,678

(22) Filed: Dec. 16, 2020

(65) Prior Publication Data

US 2022/0190583 A1 Jun. 16, 2022

(51) Int. Cl.
 *H02H 3/08* (2006.01)
 *H02H 9/02* (2006.01)
 *B60R 16/023* (2006.01)

(52) U.S. Cl.
 CPC ............ *H02H 3/08* (2013.01); *B60R 16/0238* (2013.01)

(58) Field of Classification Search
 CPC .............................. H02H 3/08; B60R 16/0238
 USPC ....................................................... 361/93.1
 See application file for complete search history.

(56) References Cited

U.S. PATENT DOCUMENTS

| | | |
|---|---|---|
| 5,867,008 A | 2/1999 | Du et al. |
| 6,381,111 B1 | 4/2002 | Reichert et al. |
| 6,494,409 B1 | 12/2002 | Franke |
| 6,710,698 B1 | 3/2004 | Jehlicka et al. |
| 7,156,063 B2 | 1/2007 | Denz |
| 10,923,902 B2 | 2/2021 | Schiemann et al. |
| 10,951,022 B2 | 3/2021 | Lang |
| 2011/0228429 A1* | 9/2011 | Ueta ................. B60N 2/0232 361/100 |
| 2013/0313896 A1 | 11/2013 | Gless et al. |
| 2017/0141599 A1 | 5/2017 | Naddei |
| 2018/0086606 A1* | 3/2018 | Raassina ............... B66B 25/00 |
| 2019/0379200 A1 | 12/2019 | Fournier et al. |
| 2021/0066905 A1* | 3/2021 | Heinrich ............... H02H 3/087 |

FOREIGN PATENT DOCUMENTS

| | | |
|---|---|---|
| DE | 10110046 A1 | 9/2002 |
| DE | 10301528 A1 | 7/2004 |
| DE | 102005040195 A1 | 3/2007 |
| DE | 102010020294 A1 | 8/2011 |
| DE | 102013217494 A1 | 3/2015 |

(Continued)

*Primary Examiner* — Jared Fureman
*Assistant Examiner* — Lucy M Thomas
(74) *Attorney, Agent, or Firm* — Brooks Kushman P.C.

(57) ABSTRACT

In at least one embodiment, an apparatus for a vehicle is provided. The apparatus includes a polyswitch and a switching device. The polyswitch includes a first resistance. The switching device is in parallel with the polyswitch. The switching device includes a second resistance that is less than the first resistance. The switching device is configured to enable a first current to flow therethrough when the vehicle is in an active mode. The switching device is configured to enable a first current to flow therethrough to power all electrical loads of the vehicle when the vehicle is in an active mode. The first resistance of the polyswitch is configured to enable a second current that is less than the first current to flow to a portion of the loads when the vehicle is in a sleep mode.

19 Claims, 6 Drawing Sheets

(56) References Cited

FOREIGN PATENT DOCUMENTS

| | | |
|---|---|---|
| DE | 102014211083 A1 | 12/2015 |
| DE | 202016101273 U1 | 4/2016 |
| DE | 202016105015 U1 | 3/2017 |
| FR | 3055495 B1 | 1/2020 |

* cited by examiner

NORMAL CONDITION - VEHICLE / LOAD SLEEP

FAULT OPERATION - LOAD FAULT

Note: $I_{LOAD\ FAULT}$ is Limited by the Tripped Polyswitch

APPARATUS FOR PERMANENT SUPPLY WITH A SWITCH

TECHNICAL FIELD

Aspects disclosed herein generally relate to an apparatus for providing a permanent supply with a switch. In one aspect, the apparatus may include a solid-state switching device that is coupled with a polyswitch for protecting a load against a short circuit while maintaining low quiescent currents in a sleep mode. These aspects and others will be discussed in more detail herein.

BACKGROUND

DE202016101273U1 provides a storage system for storing electrical energy with at least one first energy store and with at least one second energy store having a different cycle stability and/or charge and discharge characteristics and by a parallel connection for discharging with at least one electrical load and are connected to the charge with at least one energy source. The energy stores have at least approximately the same rated voltage and that between the two energy stores where one as a current limit and/or circuit formed as current control or current regulation and/or circuit breaker is provided for controlling a priority charge of the at least one first energy store and/or for controlling a priority discharge of the at least one second energy store.

SUMMARY

In at least one embodiment, an apparatus for a vehicle is provided. The apparatus includes a polyswitch and a switching device. The polyswitch includes a first resistance. The switching device is in parallel with the polyswitch. The switching device includes a second resistance that is less than the first resistance. The switching device is configured to enable a first current to flow therethrough to power all electrical loads of the vehicle when the vehicle is in an active mode. The first resistance of the polyswitch is configured to enable a second current that is less than the first current to flow to a portion of the loads when the vehicle is in a sleep mode.

In at least another embodiment, an apparatus for a vehicle is provided. The apparatus includes a polyswitch and a switching device. The switching device is operably coupled with the polyswitch. The switching device includes a second resistance that is less than the first resistance. The first resistance of the polyswitch is configured to enable a second current that is less than the first current to flow to a portion of the loads to perform a periodic wake up strategy in response to the vehicle being in a sleep mode.

In at least another embodiment, a system for a vehicle is provided. The system includes a polyswitch, a switching device, and a controller. The polyswitch includes a first resistance. The switching device is operably coupled with the polyswitch. The switching device includes a second resistance that is less than the first resistance. The controller is configured to transmit a first signal to the switching device to activate the switching device to enable a first current to flow therethrough and to transmit a second signal to the switching device to deactivate the switching device. The first resistance of the polyswitch is configured to enable a second current that is less than the first current to flow to a portion of the loads to perform a periodic wake up strategy after transmitting the second signal to the switching device.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
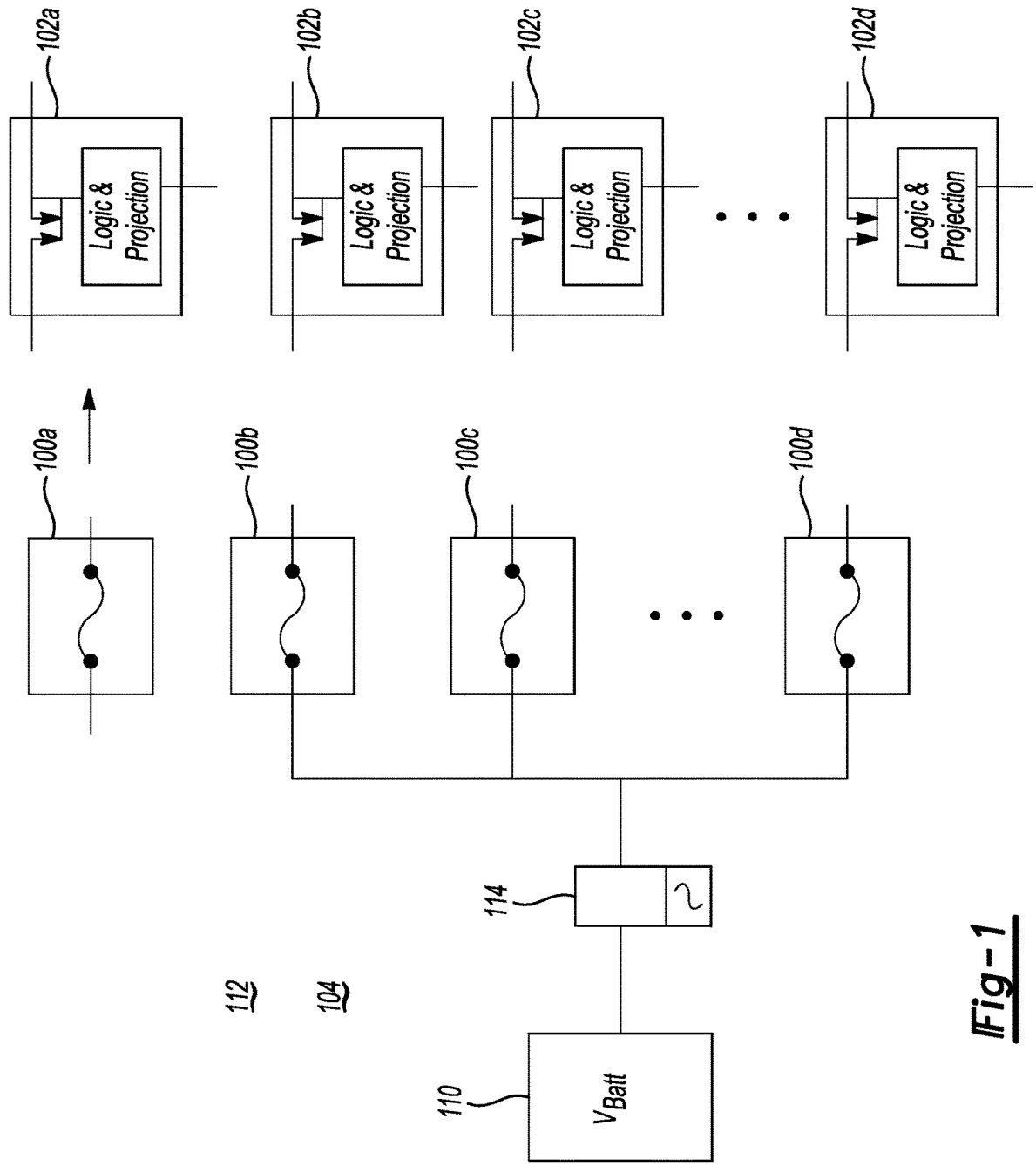
FIG. 1 depicts a plurality of pass through supply outputs including a plurality of switches.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

Aspects disclosed herein generally provide for, but not limited to, an apparatus that forms a combination of a switching device (e.g. Smart Field Effect Transistor (FET) or Metal Oxide Silicon Field Effect Transistor (MOSFET) (or other suitable switching mechanism) and a polyswitch coupled in parallel with the switching device to permanently load drivers with a stand-by strategy. The switching device facilitates a high current and provides full protection capability while the polyswitch protects an output load against short circuit conditions in a sleep mode thereby limiting a maximum current that loads positioned downstream may experience. In an active mode, a negligible amount of current flows through polyswitch when the switching device is active. The disclosed apparatus facilitates normal behavior in an active mode and negligible consumption for the apparatus in the sleep mode with protection and reduced diagnostics while maintaining current flow to loads positions downstream of the apparatus Additionally, the apparatus may be implemented such that the switching device and the polyswitch are integrated into a single component with the switching device being in parallel with the polyswitch. The apparatus also provides a short circuit protection mechanism that may be rearmed or resettable for permanent loads with negligible quiescent current.

FIG. 1 depicts a plurality of pass through—fuse devices 100a-100d and a plurality of switching devices 102a-102d (or 102). The fuse devices 100a-100d may be positioned in a power distribution box 104. In one example, the power distribution box 104 may be a smart junction box which provides, among other things, diagnostic capabilities for each of the switching devices 102a-102d. The fuse devices 100a-100d may be coupled to one or more batteries 110 ("the battery 110") in a vehicle 112. A relay 114 may be positioned between the battery 110 and the fuse devices 100a-100d to enable current from the battery 110 to flow to the fuse devices 100a-100d when activated. The fuse devices 100a-100d are generally configured to protect wires and loads (not shown) that are positioned downstream in an electrical system in the vehicle 112 in the event current exceeds a predetermined value with respect to the battery feed.

Each of the switching devices 102a-102d may be implemented as smart FETs and each may be required to provide diagnostic outputs to at least one controller 120 ("the controller 120"). In general, the switching devices 102a-102d may drain an undesired amount of current in a sleep mode. The sleep mode may correspond to the vehicle exhibiting any one or more of the following conditions: (i) a vehicle key is removed from the vehicle 112, (ii) ignition is in an off position, or (iii) ignition is set to an accessory position (or the vehicle is in an accessory mode) (e.g., a vehicle engine (not shown) is off and electrical loads are receiving power from the battery 110). While in the sleep mode, the switching devices 102a-102d may draw a small amount of current (e.g., approximately 3 μA) when the channel (e.g., channel between the source and the drain) is open. However, the amount of current required to keep the channel of a switching device 102 closed may be too high (e.g., 1 mA) in the sleep mode and may drain the battery 110. It is recognized that for some specific loads, or when the switching device 102 is positioned upstream and positioned close to the battery 110 and that additional loads are downstream, the switching device 102 should be activated (or ON) to provide a small amount of current also in stand-by.

Figure 2:
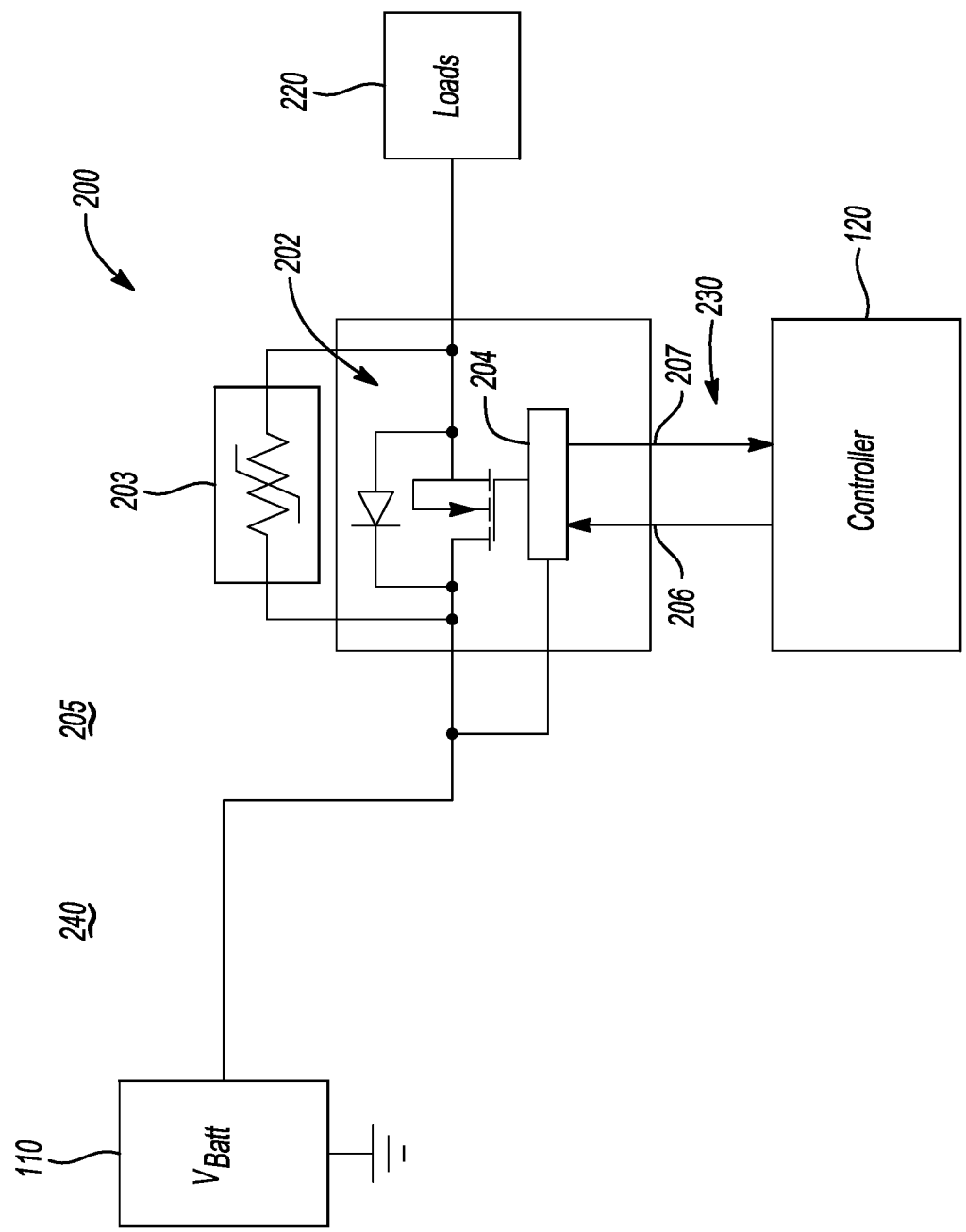
FIG. 2 generally depicts an apparatus for providing a permanent supply with a switch in accordance to one embodiment.

FIG. 2 generally depicts an apparatus 200 for providing a permanent supply with a power switching device 202 in accordance to one embodiment. The apparatus 200 includes the power switching device 202 and a polyswitch 203. The apparatus 200 may be implemented in a vehicle 240 (or system) that includes, inter alia, the battery 110 and the controller 120. The apparatus 200 may also be positioned in a junction box, smart junction box, etc. (referred to as "205). The power switching device 202 may be a FET, MOSFET, or SmartFET. In the implementation of the power switching device 202 being implemented as a SmartFET, the power switching device 202 may include smart circuitry 204 that receives a control signal on an input 206 from the controller 120 and provides a diagnostic signal on an output 207 to the controller 120. It is recognized that the controller 120 and the smart circuitry 204 may alternatively engage in bi-directional communication via a digital communication bus or other suitable alternative.

The controller 120 may activate the power switching device 202 (via the smart circuitry 204) to provide current to any number of loads 220 in the vehicle 240 in response to the control signal (or pulse width modulated (PWM) signal). The controller 120 controls the power switching device 202 to power the loads 220 when the vehicle 240 is in an active mode (e.g., key is in an ignition switch and the ignition switch is in RUN or START position). The power switching device 202 provides diagnostics about the loads 220 and the power switching device 202 on the diagnostic signal to the controller 120. The diagnostic information may include information related to a value of current passing through the power switching device 202, temperature of the power switching device 202, and a switching frequency of the pulse width modulation (PWM) control signal used to switch the power switching device 202. In one example, the power switching device 202 (or the smart circuitry 204) may utilize the input 206 to receive a digital input (e.g., the control signal) from the controller 120 and utilize the output 207 to provide the diagnostic information as a digital output. In another embodiment, it is also recognized that the diagnostic information may be analog.

The smart circuitry 204 may communicate with the controller 112 via a digital bus 230. The digital bus 230 may be implemented as Serial Peripheral Interface (SPI) communication bus or other suitable alternative. Thus, the controller 120 may command the smart circuitry 204 via digital commands over the digital bus 230 to control the switching device 202 switch at a specific (or continuous) PWM based signal. In addition, the controller 120 may receive diagnostic messages over the digital bus 230 that relate to channel current value, temperature, and PWM status, etc. In general, the diagnostic information may correspond to a value of the current flowing to the loads 220 and that may refer to load status such as for example "good", "open", "short-circuit", "low-ohmic" (or low resistance), etc. In the event the diagnostic information is transmitted via a digital communication bus, the diagnostic information may include device-junction temperature along with complex control commands such as PWM parameters.

It is recognized that the apparatus 200 may include any number of the apparatuses 200 (e.g., any number of power switching devices 202 and any number of polyswitches 203). The polyswitch 203 is positioned in parallel to the power switching device 202. As noted above, the power switching device 202 provides high current when the vehicle 240 is in the active mode (e.g., key is in ignition). The power switching device 202 also provides diagnostics when the vehicle 240 is in the active mode.

When the key is removed from the vehicle 240 (i.e., when the ignition is in the accessory position or the vehicle 240 is in the accessory mode which corresponds to the vehicle being in a sleep mode or in a reduced-consumption mode), the controller 120 disables the power switching device 202 (e.g., opens the power switching device 202) thus preventing current to flow to the loads 220 through the power switching device 202 for those loads 220 that are not intended to be operating in the sleep mode or in the reduced-consumption mode. In the sleep mode or in the reduced-consumption mode, a majority of the diagnostics or the entirety of diagnostics are also disabled. Vehicle original equipment manufacturers (OEMs) require the vehicle 240 to enable a minimal current that is below a current threshold when the vehicle 240 is in the sleep mode or the reduced consumption mode to preserve battery life and to ensure that the desired loads 220 receive current in the sleep or reduced-consumption mode. To ensure that the vehicle 240 maintains the minimal current that is below the current threshold in the sleep mode or the reduced-consumption mode, the polyswitch 203 is configured to provide a resistance that is generally, for example, 10 to 40 times (or even larger) greater than the resistance provided by the power switching device 202 in the active mode. Thus, while the power switching device 202 is disabled (or deactivated), a small amount of current still flows through the polyswitch 203 to ensure that the minimal current is delivered to the desired loads 220 to power such loads in the sleep mode or the reduced-consumption mode. In the event, current in the vehicle 240 exceeds the minimal current threshold in the sleep or reduced-consumption mode (e.g., an anomaly), the resistance provided by the polyswitch 203 acts as a circuit breaker and disables the flow of the current that is in excess of the minimal current threshold. For example, the voltage from the battery 110 exhibits a drop due to the resistance of the polyswitch 203 thereby mitigating the excess current at the loads 220.

In the sleep or reduced-consumption mode, the amount of current that flows through the polyswitch 203 may be 1/10 to 1/40 the amount of current that would otherwise flow through the power switching device 202 when the power switching device 202 is activated. In general, if the power switching device 202 did not include the polyswitch 203, the loads 220 would not receive some current. The polyswitch 203 is arranged such that a current path is maintained even in the sleep mode and the loads 220 may continue to drain minimal current thereby causing a minimal voltage drop. When the key is removed from the vehicle 240 and the main power switching device 202 is deactivated, the nominal resistance of the polyswitch 202 is low enough that the respective voltage drop does not affect the needs of the loads 220. If current demand is faulty (e.g., over a threshold), the polyswitch 203 trips causing its resistance thereof to be high to prevent a higher current level.

In general, the polyswitch 203 is configured or arranged with a resistance value that is high enough (e.g., 0.8 Ohms) so as to be negligible during the vehicle active state (or normal operating mode) since current will not pass therethrough due to the value of resistance value as noted directly above. However, the resistance value of the polyswitch 203 is arranged to enable stand-by current to flow without a significant voltage drop when the vehicle 240 is in the sleep mode. A significant voltage drop for the loads 220 may prevent load function when the vehicle 240 is in the sleep mode. Further, if too much current is drained from the loads 220 during an anomalous state, then the polyswitch 203 may overheat and increase its resistance value to limit such excess current when the vehicle 240 is in the standby mode.

The polyswitch 203 provides current protection for the loads 220 when the vehicle 240 is in the sleep mode. Given that the polyswitch 203 is arranged to provide a large amount of resistance and that the polyswitch 203 is parallel to the power switching device 202, there is no need for the controller 120 to stay active to power the power switching device 202 when the vehicle is in the sleep mode. As noted above, in the sleep mode (or reduced consumption mode), the controller 120 deactivates the switching device 202. In this case, the channel of the switching device 202 (e.g., the channel between the source and the drain of the transistor) is deactivated, and all current being provided by the battery 110 is passed to the polyswitch 203. In this case, the switching device 202 may not be able to perform diagnostics while the switching device 202 is deactivated. However, it is recognized that in the event it is necessary for the switching device 202 to perform diagnostics while the vehicle 240 is in the sleep mode (or the reduced consumption mode), the controller 120 may periodically wake up in the sleep mode and selectively activate the switching device 202 to perform a limited version of diagnostics.

It is recognized that in the sleep mode and as noted above, the apparatus 200 is required to maintain a minimal current to enable the desired loads 220 to receive current in the sleep or reduced-consumption mode. In particular, the resistance of the polyswitch 203 enables the polyswitch 203 to deliver the minimal current to the desired loads 220 in the sleep or reduced-consumption mode. As shown in FIG. 2, the smart circuitry 204 is operably coupled to the battery 110. Given this condition, the smart circuitry 204 may experience a small current draw of, for example, 1 µA. In the event the polyswitch 203 was not provided, the switching device 202 remains active and the current draw may be well in excess of 1 µA. It is recognized that the loads 220 (e.g., any other electrical devices in the vehicle 240) may continue to draw up to 20 mA with the presence of the polyswitch 203 in the apparatus 200 and when the apparatus 200 is in the sleep mode. This may meet Original Equipment Manufacturer (OEM) requirements for key off load current.

Figure 3:
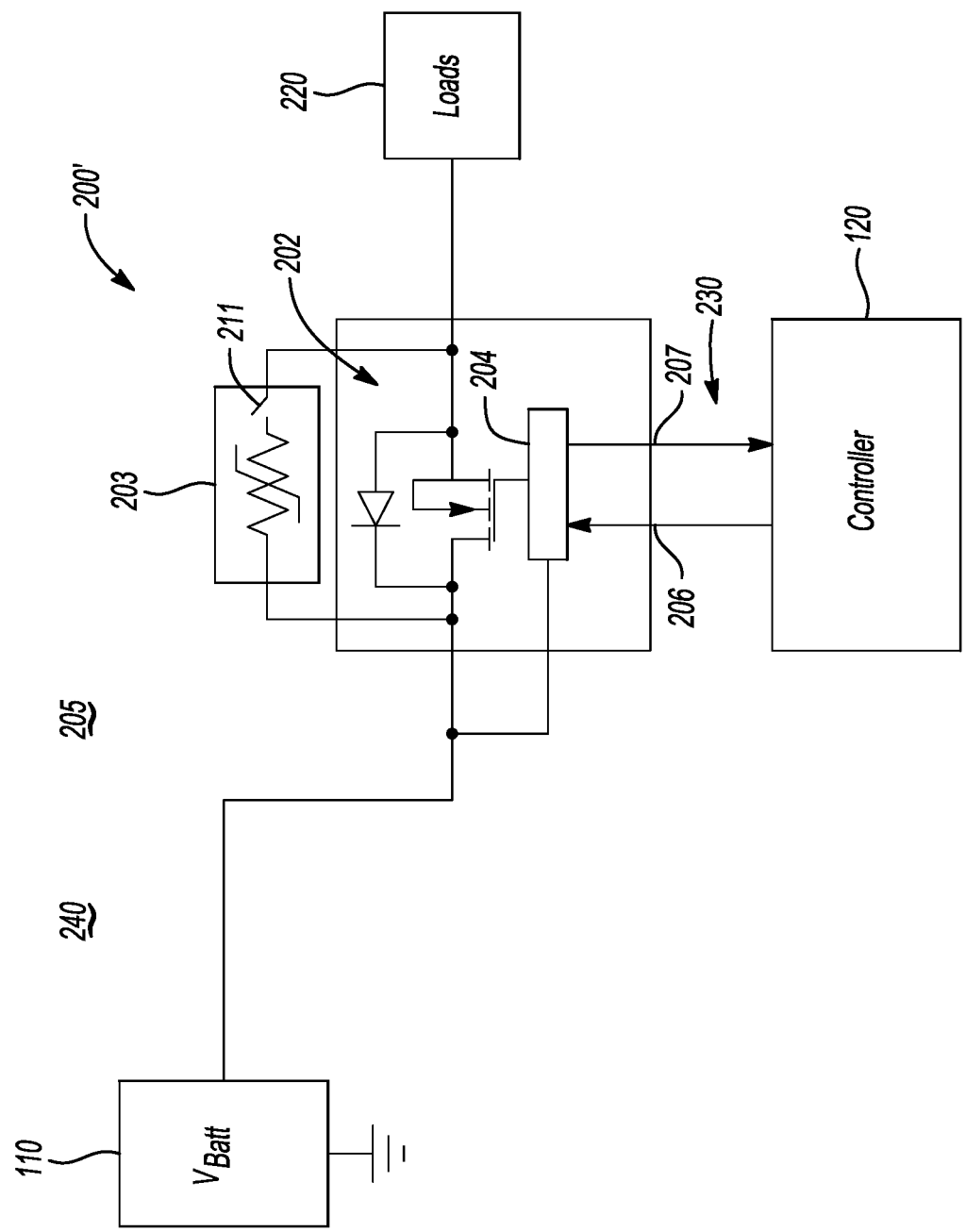
FIG. 3 generally depicts another apparatus for providing a permanent supply with a switch in accordance to one embodiment.

FIG. 3 generally depicts another apparatus 200' for providing a permanent supply with the power switching device 202 in accordance to one embodiment. The apparatus 200' is generally similar to apparatus 200 of FIG. 2, however the power switching device 202 includes an auxiliary switch 211 that may be in series with the polyswitch 203. The controller 120 or other suitable control mechanism is configured to control the auxiliary switch 211 to open or close to enable current to pass through the polyswitch 203. The controller 120 controls the auxiliary switch 211 to be open when the vehicle 240 is in active mode and the auxiliary switch 211 to be closed in the sleep or reduced consumption-mode.

When the vehicle 240 moves from the active mode to the sleep mode, the controller 120 controls the auxiliary switch 211 to transition from the open state to the closed state. In response to this transition, the controller 120 measures the loads 220 and determines that the loads 220 are in a low consumption mode (e.g., 20 mA). In this case, the controller 120 controls the power switching device 202 to open and the controller 120 may then transition into a sleep mode. The controller 120 may periodically wake up and measure current across the load(s) 220 when in the sleep or reduced consumption mode and may open the auxiliary switch 211 to prevent the battery 110 from being depleted. For example, when the vehicle 240 is in the sleep or reduced consumption-mode, the controller 120 may periodically wake up and activate the power switching device 202 to measure (or diagnose) the current across the loads 220. The controller 120 may open the auxiliary switch 211 after waking up to mitigate the depletion of the voltage of the battery 110. The controller 120 may perform the periodic wakeup over a long periodicity (e.g., once per day or half day). In general, the controller 120 may open the auxiliary switch 211 when the vehicle 240 is in the active mode, or alternatively, open the auxiliary switch 211 immediately upon the vehicle 240 detecting the over current condition in the sleep or reduced consumption mode.

When the vehicle 204 transitions from the sleep mode or reduced consumption mode to the active mode, the controller 120 closes the power switching device 202 and opens the auxiliary switch 211. In case of an anomaly (e.g., an overcurrent fault), the controller 120 detects (or measures) the overcurrent condition once entering into the active mode and controls the power switching device 202 and the auxiliary switch 211 to open to prevent the flow of current. In the event the controller 120 does not detect a failure (e.g., over current condition) after the vehicle 204 transitions from the sleep or reduced consumption mode, the controller 120 closes the power switching device 202 and opens the auxiliary switch 211 and the apparatus 200' operates in a normal manner.

Figure 4:
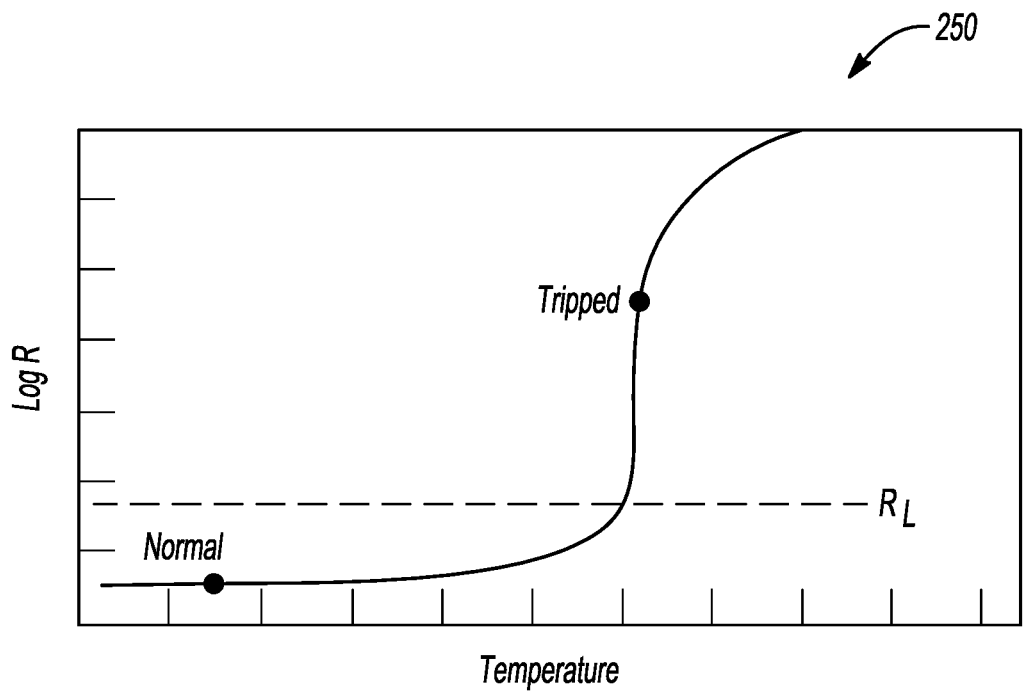
FIG. 4 depicts a plot illustrating a behavior for a polyswitch of the apparatus of FIG. 2 in accordance to one embodiment.

FIG. 4 depicts a plot 250 illustrating a behavior for the polyswitch 203 of FIGS. 2 and 3 in accordance to one embodiment. Plot 250 illustrates that as the temperature across the polyswitch 203 increases and reaches a predetermined temperature threshold, the polyswitch 203 trips (e.g., breaks the circuit) and prevents the flow of current from the battery 110 in the sleep mode. An increase in temperature across the polyswitch 203 is generally indicative of a short circuit condition (or other predetermined excess current amount). In this case, the polyswitch 203 acts as circuit breaker and breaks the flow of current therethrough once the temperature reaches the predetermined temperature threshold (or an overcurrent condition is present). Once the overcurrent condition is removed due to the faulty condition being removed, the polyswitch 203 resets itself and the small amount of current flows therethrough. For example, the polyswitch 203 may reset when the polyswitch 203 cools and then returns to a normal resistance value.

Figure 5:
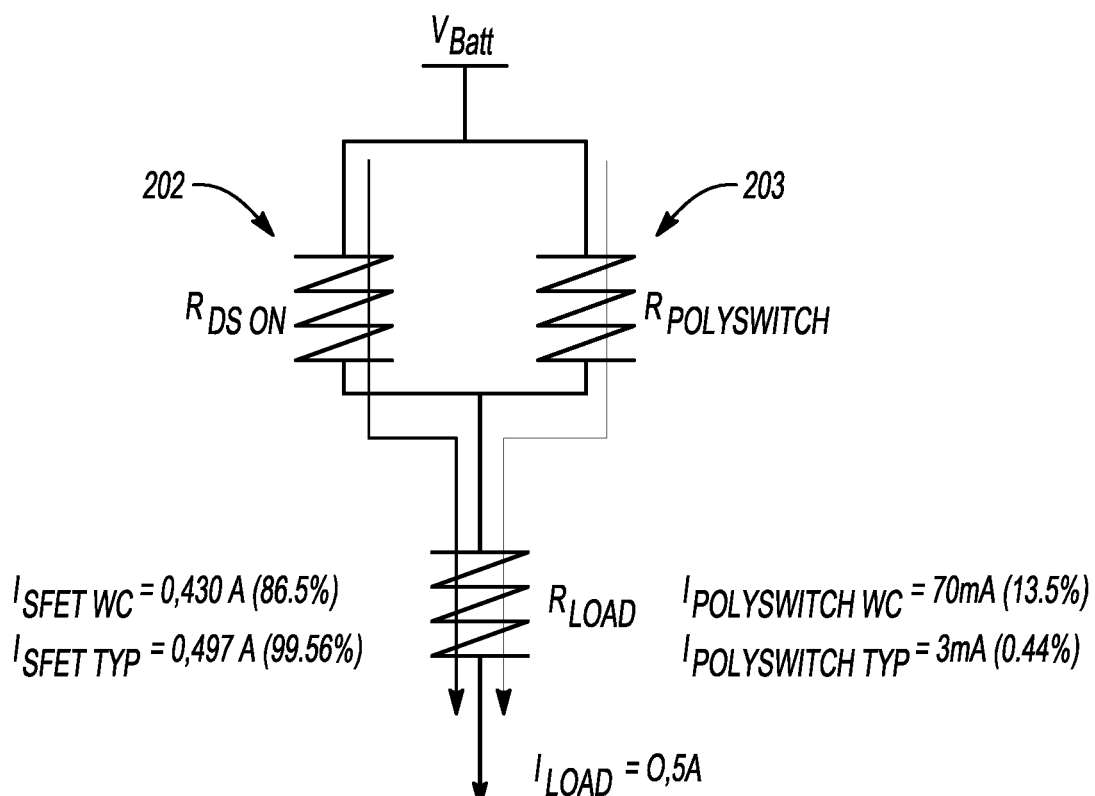
FIG. 5 generally depicts another representation of a switching device, a load, and the polyswitch of the apparatus of FIGS. 2 and 3 and current levels when the apparatus is in an active mode in accordance to one embodiment.

FIG. 5 generally depicts a representation of resistance of the power switching device 202 (e.g., $R_{DS}$) and resistance of the polyswitch 203 (e.g., $R_{polyswitch}$) in accordance to one embodiment. In connection with the power switching device 202 and resistance $R_{DS}$, an example of a typical current that flows through the power switching device 202 when the vehicle is in the active mode, may be 0.497 A. In connection with the polyswitch 203 and resistance $R_{polyswitch}$, an example of a typical current that flows through the polyswitch 203 may be 3 mA. In this case, the total current (e.g., $I_{load}$) that flows across resistance of the load (e.g., $R_{load}$) is approximately 0.5 A. A worst case scenario of the current that flows through the power switching device 202 in the active mode is 0.430 A and a worst case scenario of the current that flow through the polyswitch 203 is 70 mA and the sum of these values also provide a total current (e.g., $L_{load}$) that flows across resistance of the load (e.g., $R_{load}$) is approximately 0.5 A. Since the vehicle 240 is in the active mode, FIG. 4 generally illustrates that a smaller amount of current flows through the polyswitch 203 in comparison to the amount of current that flow through the switching device 202.

FIGS. 6A-6D generally depicts various representations of the switching device 202 and the polyswitch 203 and corresponding representations of current/resistance values of the apparatus 200 of FIG. 2 when the apparatus 200 is in a normal condition or fault condition in accordance to one embodiment.

Figure 6A:
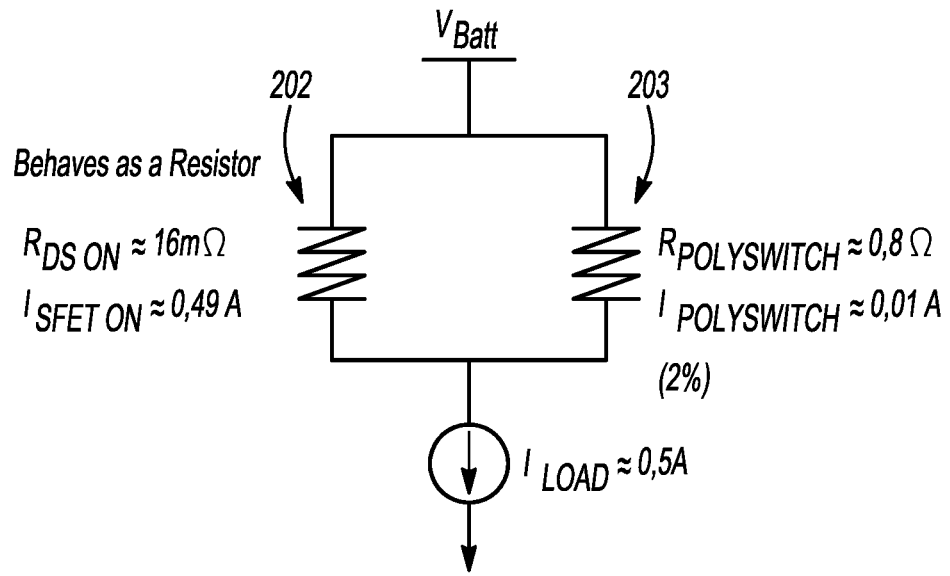
FIGS. 6A-6D generally depicts various representations of the switching device and the polyswitch and corresponding representations of current/resistance values of the apparatus of FIGS. 2 and 3 when the apparatus is in a normal condition or fault condition in accordance to one embodiment.

FIG. 6A generally depicts a representation of the switching device 202 and the polyswitch 203 exhibiting a normal condition while the vehicle is in the active mode (e.g., key is in an ignition switch, the ignition switch is in RUN or START position, all loads 202 in the vehicle 240 are operating) in accordance to one embodiment. As shown, the switching device 202 is activated thereby enabling approximately 0.5 A to the loads 220. The resistance of the polyswitch is 0.8 Ohms and current that flow therethrough is 0.01 Amps.

Figure 6B:
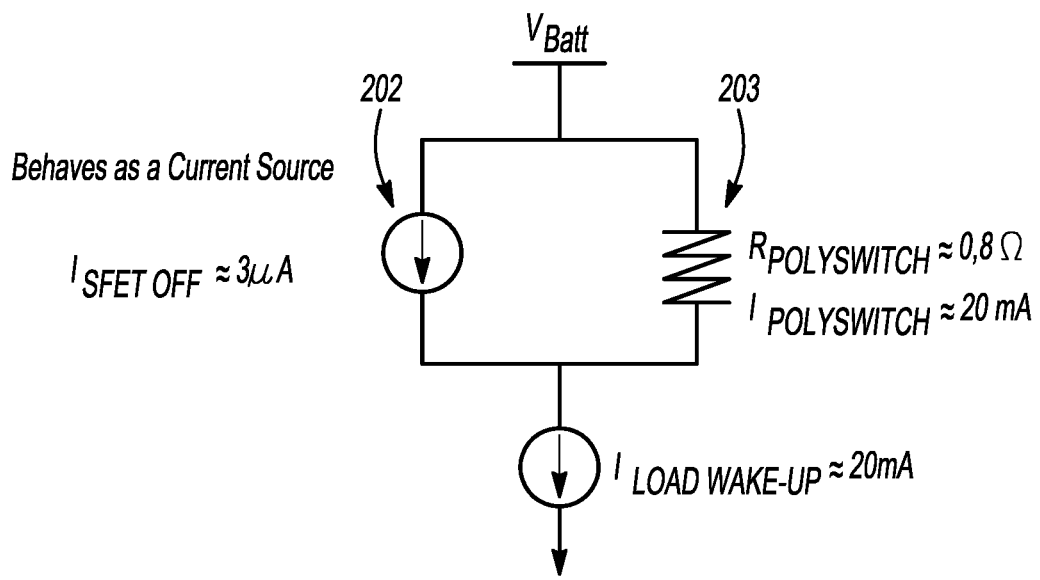

FIG. 6B generally depicts a representation of the switching device 202 and the polyswitch 203 exhibiting a normal condition while the vehicle 240 is in the sleep mode in accordance to one embodiment. For example, the vehicle 240 is in the sleep mode but various loads 220 wake up (e.g., a periodically wakeup) to perform a predetermined operation in the sleep mode (e.g., remote keyless entry (RKE)/ passive entry passive start (PEPS) module, tire pressure monitoring system (TPMS), etc. wake up to detect wireless signals). As shown, the switching device 202 is deactivated and behaves as a small current source enabling a small amount of current (e.g., 3 uA) to pass therethrough to the loads 220. The resistance of the polyswitch 203 exhibits no change and remains at 0.8 Ohms. Given that the switching device 202 is deactivated (or open), the polyswitch 203 exhibits a voltage drop across its resistance and provides current in the amount of 20 mA (e.g., minimal amount of current) to provide to the loads 220 (e.g., (RKE)/(PEPS) module, TPMS)) that require current to operate when the vehicle 240 is in the sleep mode etc.

Figure 6C:
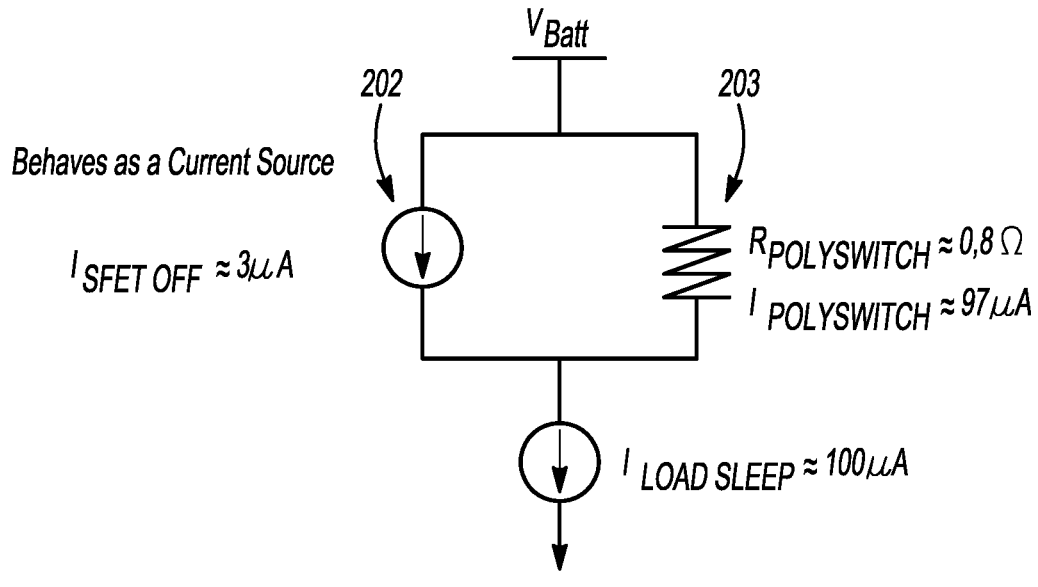

FIG. 6C generally depicts a representation of the switching device 202 and the polyswitch 203 exhibiting a normal condition while the vehicle 240 is in the sleep mode in accordance to one embodiment. For example, in this case, the vehicle 240 is in the sleep mode but various loads 220 periodically go to sleep after waking up (e.g., remote keyless entry (RKE)/passive entry passive start (PEPS) module, tire pressure monitoring system (TPMS), etc. wake up to detect wireless signals). As shown, the switching device 202 is deactivated and behaves as a small current source enabling a small amount of current (e.g., 3 uA) to pass therethrough to the loads 220. The resistance of the polyswitch 203 exhibits no change and remains at 0.8 Ohms. Given that the switching device 202 is deactivated (or open), the polyswitch 203 exhibits a voltage drop across its resistance and provides current in the amount of 100 uA (e.g. the sum of current across the switching device 202 (i.e., 3 uA and 97 uA) to provide to the loads 220 (e.g., (RKE)/(PEPS) module, TPMS)) when such loads 220 go back to sleep after the wakeup condition occurs as discussed above in connection with FIG. 5B.

Figure 6D:
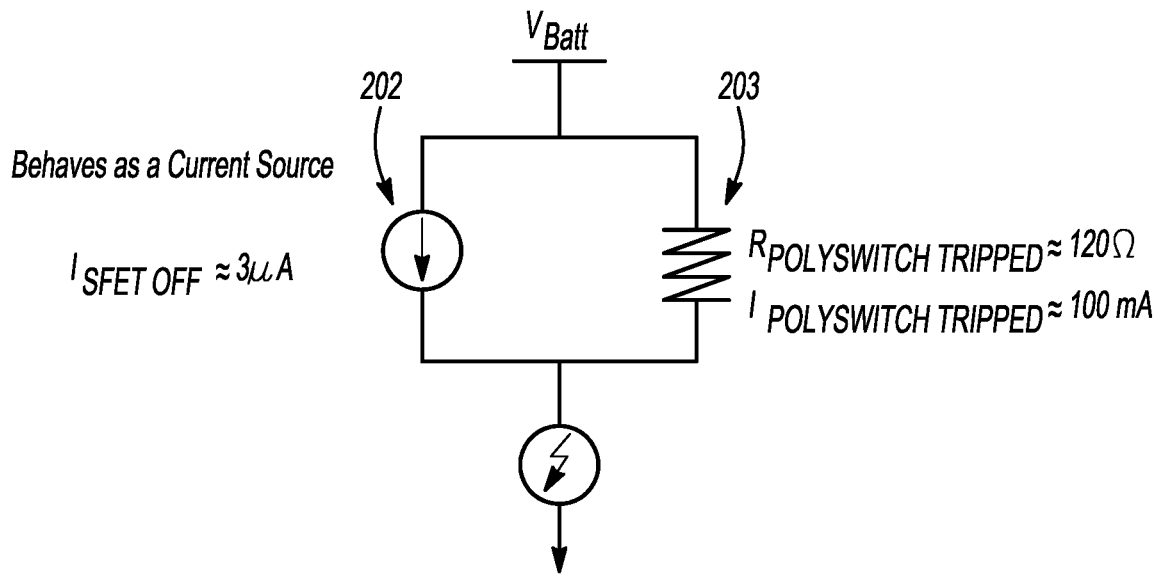

FIG. 6D generally depicts a representation of the switching device 202 and the polyswitch 203 exhibiting a fault condition in accordance to one embodiment. In this case, the polyswitch 203 trips due to the excessive current that may be flowing therethrough that is attributed to a short circuit condition. The switching device 202 is deactivated and still behaves as a small current source providing 3 uA of current. Once current exceeds a predetermined current threshold, the polyswitch 203 breaks the circuit and its resistance increases to, for example, 120 Ohms thereby reducing the amount of current being passed therethrough to 100 mA to the loads 220.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. An apparatus for a vehicle, the apparatus comprising:
a polyswitch including a first resistance;
a switching device positioned in parallel with the polyswitch including a second resistance that is less than the first resistance;
wherein the switching device is configured to enable a first current to flow therethrough to power all electrical loads of the vehicle when the vehicle is in an active mode,
wherein the first resistance of the polyswitch is configured to enable a second current that is less than the first current to flow to a portion of the loads when the vehicle is in a sleep mode, and
wherein the second current enables the portion of the loads to periodically wake up when the vehicle is in the sleep mode; and
an auxiliary switch positioned in series with the polyswitch,
wherein the switching device is configured to periodically close in the sleep mode to measure current across the loads of the vehicle,
wherein the auxiliary switch is opened in response to the current across the loads of the vehicle exceeding a predetermined value, and
wherein the auxiliary switch is closed in response to the vehicle being in the sleep mode.

2. The apparatus of claim 1, wherein the polyswitch is configured to prevent the second current from being transferred to the portion of the loads when the second current exceeds a predetermined current threshold.

3. The apparatus of claim 1, wherein the portion of the loads include a remote keyless entry controller, a passive entry passive system controller, or a tire pressure monitoring system.

4. The apparatus of claim 1, wherein the switching device is deactivated when the polyswitch enables the second current to flow therethrough.

5. The apparatus of claim 1, wherein the sleep mode corresponds to one of (i) vehicle key being removed from the vehicle, (ii) an ignition switch being in an off position, and (iii) the vehicle key being set in accessory position in the vehicle.

6. The apparatus of claim 1, wherein the polyswitch provides the second current to the portion of the loads to receive wireless signals in response to periodically waking up the portion of the loads when the vehicle is in the sleep mode.

7. The apparatus of claim 1, wherein the auxiliary switch is opened in response to the vehicle transitioning from the sleep mode to the active mode.

8. An apparatus for a vehicle, the apparatus comprising:
a polyswitch including a first resistance;
a switching device being operably coupled with the polyswitch, the switching device including a second resistance that is less than the first resistance;
wherein the switching device is configured to enable a first current to flow therethrough when the vehicle is in an active mode,
wherein the first resistance of the polyswitch is configured to enable a second current that is less than the first current to flow to a portion of loads of the vehicle to perform a periodic wake up strategy in response to the vehicle being in a sleep mode; and
an auxiliary switch positioned in series with the polyswitch,
wherein the switching device is configured to periodically close in the sleep mode to measure current across the loads of the vehicle,
wherein the auxiliary switch is opened in response to the current across the loads of the vehicle exceeding a predetermined value, and
wherein the auxiliary switch is closed in response to the vehicle being in the sleep mode.

9. The apparatus of claim 8, wherein the polyswitch is configured to prevent the second current from being transferred to the portion of the loads when the second current exceeds a predetermined current threshold.

10. The apparatus of claim 8, wherein the portion of the loads include a remote keyless entry controller, a passive entry passive system controller, or a tire pressure monitoring system.

11. The apparatus of claim 8, wherein the second current enables the portion of the loads to periodically wake up and receive wireless signals when the vehicle is in the sleep mode.

12. The apparatus of claim 8, wherein the switching device is deactivated when the polyswitch enables the second current to flow therethrough.

13. The apparatus of claim 8, wherein the sleep mode corresponds to one of (i) a vehicle key being removed from the vehicle, (ii) an ignition switch being in an off position, and (iii) the vehicle key being set in accessory position in the vehicle.

14. The apparatus of claim 8, wherein the auxiliary switch is opened in response to the vehicle transitioning from the sleep mode to the active mode.

15. A system for a vehicle, the system comprising:
a polyswitch including a first resistance;
a switching device being operably coupled with the polyswitch, the switching device including a second resistance that is less than the first resistance;
a controller configured to:
transmit a first signal to the switching device to activate to the switching device to enable a first current to flow therethrough; and
transmit a second signal to the switching device to deactivate the switching device;
wherein the first resistance of the polyswitch is configured to enable a second current that is less than the first current to flow to a portion of loads of the vehicle to perform a periodic wake up strategy after transmitting the second signal to the switching device; and
an auxiliary switch positioned in series with the polyswitch,
wherein the switching device is configured to periodically close in a sleep mode to measure current across the loads of the vehicle,
wherein the auxiliary switch is opened in response to the current across the loads of the vehicle exceeding a predetermined value, and
wherein the auxiliary switch is closed in response to the vehicle being in the sleep mode.

16. The system of claim 15, wherein the polyswitch is configured to prevent the second current from being transferred to the portion of the loads when the second current exceeds a predetermined current threshold.

17. The system of claim 15, wherein the portion of the loads include a remote keyless entry controller, a passive entry passive system controller, or a tire pressure monitoring system.

18. The system of claim 15, wherein the second current enables the portion of the loads to periodically wake up and receive wireless signals when the vehicle is in a sleep mode.

19. The system of claim 15, wherein the switching device is deactivated when the polyswitch enables the second current to flow therethrough.

* * * * *